UNITED STATES PATENT OFFICE.

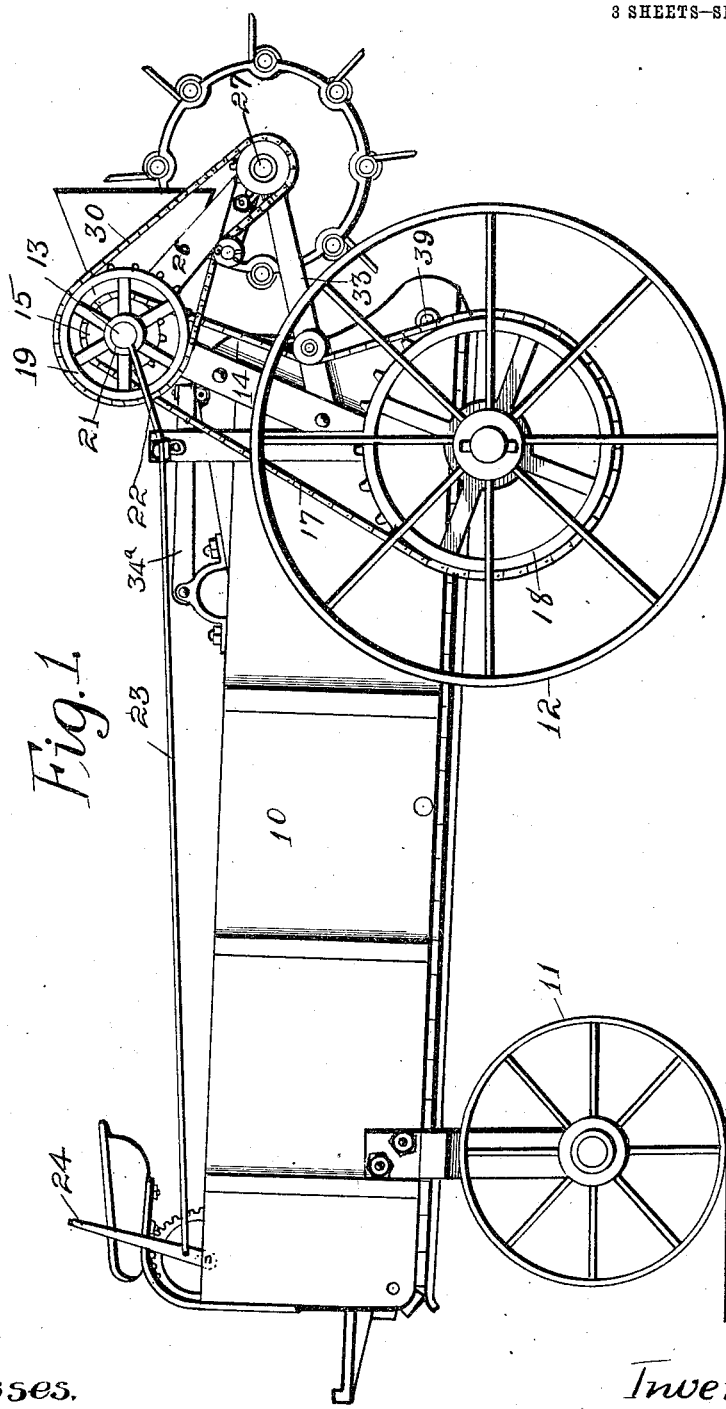

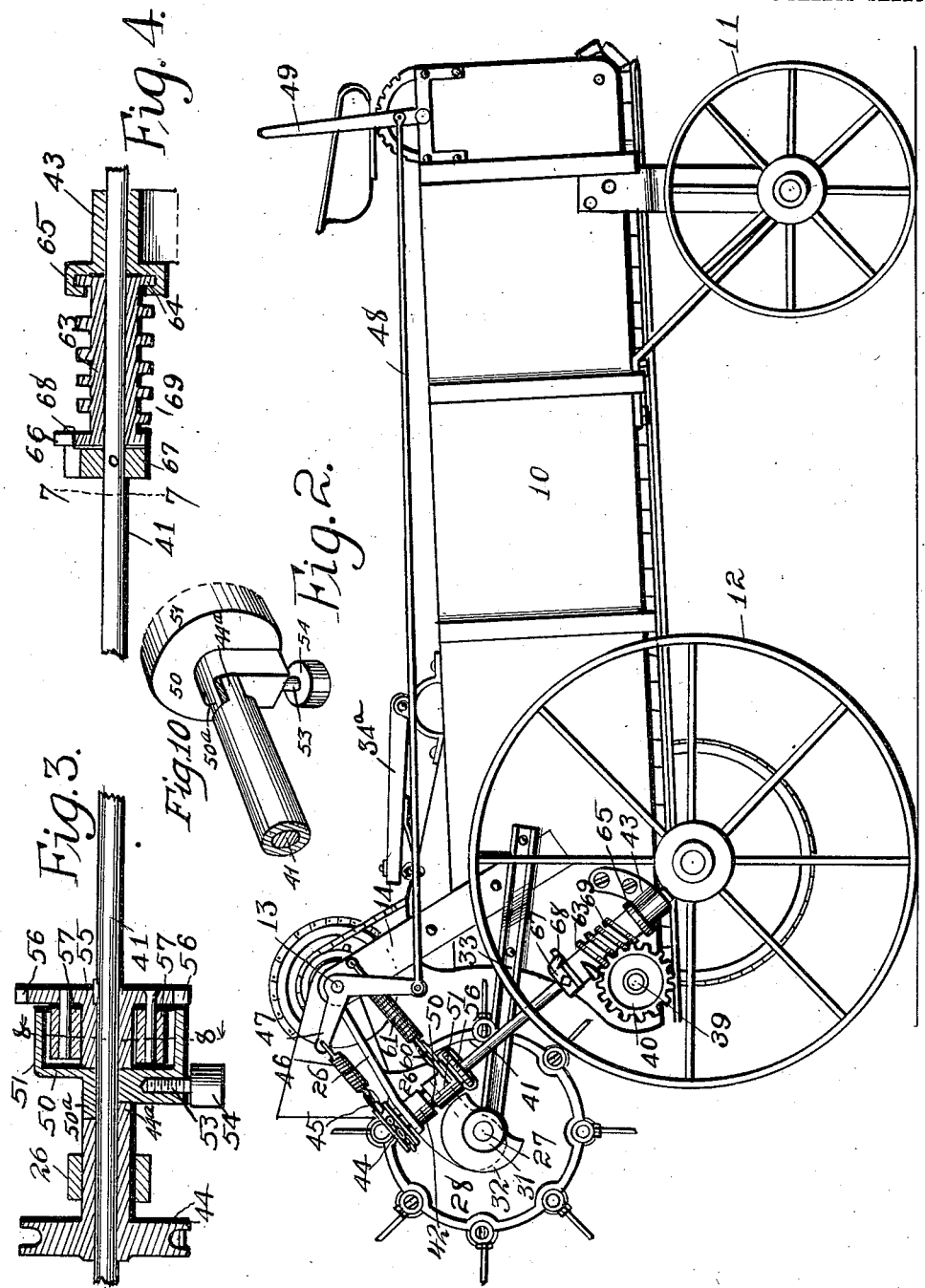

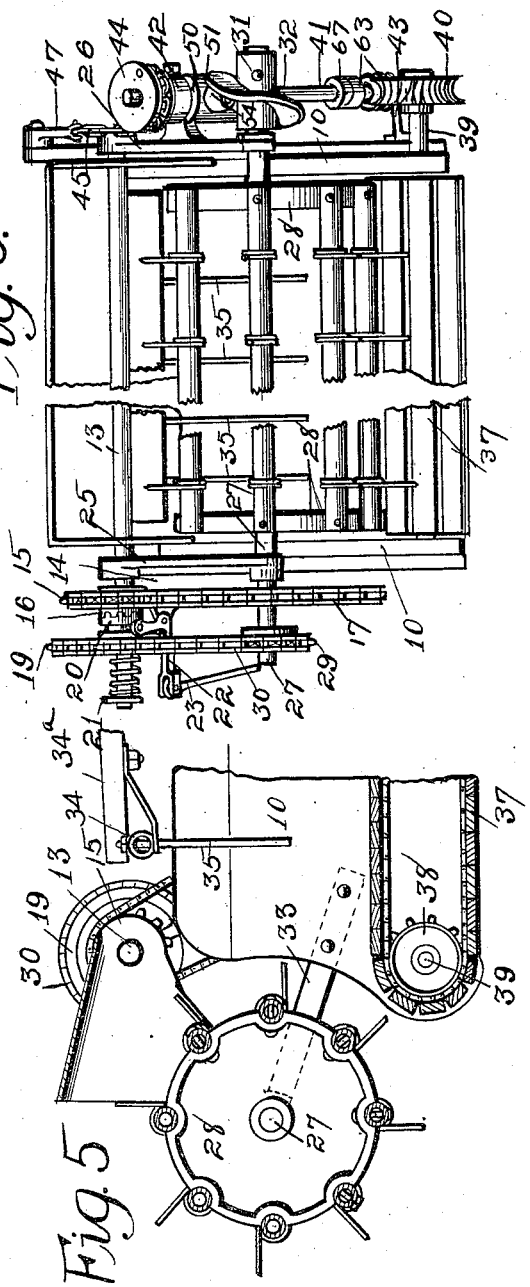

CHARLES L. DYK, OF ORANGE CITY, IOWA.

MANURE-SPREADER.

1,046,746.

Specification of Letters Patent.

Patented Dec. 10, 1912.

Application filed December 26, 1911. Serial No. 667,988.

*To all whom it may concern:*

Be it known that I, CHARLES L. DYK, a citizen of the United States, residing at Orange City, in the county of Sioux and State of Iowa, have invented a certain new and useful Manure-Spreader, of which the following is a specification.

My invention relates to that class of manure spreaders in which the load is carried upon a movable apron toward the delivery end of the machine and when at the delivery end it is engaged by a rotary distributing cylinder and thrown rearwardly.

The object of my invention is to provide a manure spreader of this class with simple, inexpensive and durable means whereby the operator may readily and easily adjust the device to change the speed of the apron relative to that of the distributing cylinder to thereby adjust the device to the conditions required when handling material of different kinds; and also to enable the operator to regulate the thickness of the layer of manure delivered from the machine.

A further object is to provide means whereby, when there is a quantity of material at the rear end of the wagon bed the distributing cylinder will be moved thereby rearwardly and this rearward movement of the cylinder will automatically throw the apron-moving mechanism out of gear so that the advance of the apron is stopped until such time as the cylinder removes the excessive material whereupon the apron will be again automatically thrown into operative relation with the cylinder shaft.

My invention consists in certain details, in the construction, arrangement and combination of the various parts of the device, whereby the objects contemplated are attained, as hereinafter more fully set forth, pointed out in my claims and illustrated in the accompanying drawings, in which—

Figure 1 shows a side elevation of a manure spreader embodying my invention. Fig. 2 shows a similar view illustrating the opposite side. Fig. 3 shows an enlarged, detail, sectional view illustrating the ratchet device therein. Fig. 4 shows a detail, sectional view of a part of the apron-driving shaft illustrating the means by which the apron is thrown out of gear upon a rearward movement of the spreading cylinder. Fig. 5 shows a central, longitudinal, vertical, sectional view through the rear end of the apron and the spreading cylinder and connected parts. Fig. 6 shows a rear elevation of the complete device embodying my invention. Fig. 7 shows a sectional view on the line 7—7 of Fig. 4. Fig. 8 shows a sectional view on the line 8—8 of Fig. 3, and Fig. 9 illustrates the ratchet device for preventing backward rotation of the apron-driving shaft. Fig. 10 shows a detail perspective view for illustrating the connection between the grooved wheel on the connecting shaft and the circular flange on the connecting shaft.

Referring to the accompanying drawings, I have used the reference numeral 10 to indicate the wagon body having the forward supporting wheels 11 and the rear supporting and traction wheels 12. Mounted above the delivery end of the wagon body is a stationary shaft 13 supported on the brackets 14. This stationary shaft is provided on one end with a sprocket wheel 15 having a clutch member 16. This sprocket wheel 15 is connected by a chain 17 with a sprocket wheel 18 on one of the traction wheels. Slidingly mounted on the shaft 13 is a sprocket wheel 19 having a clutch member 20 designed to coact with the clutch member 16. A spring 21 is provided for yieldingly holding the clutch member 20 in engagement with the clutch member 16.

I have provided for holding the clutch member 20 out of engagement by means of a lever 22 connected by a rod 23 with a lever 24 at the front of the machine. When the clutches are out of engagement the sprocket wheel 15 may run idle upon the advance of the machine but when the clutch members are in engagement the sprocket wheel 19 will be driven in unison with the sprocket wheel 15.

Mounted on opposite ends of the shaft 13 are two hangers 25 and 26 pivotally supported and provided with suitable bearings at their ends to receive the shaft 27 on which the spreading cylinder 28 is fixed. This shaft 27 is provided with a sprocket wheel 29 connected by a chain 30 with the sprocket wheel 19. On the opposite end of the shaft 27 is a hub 31 having a spiral cam 32 thereon for purposes hereinafter made clear. The forward movement of the spreading cylinder is limited by means of two arms 33 fixed to the wagon body and designed to engage the shaft 27. The weight of the spreading cylinder normally holds the shaft 27 against the arms 33 so that a considerable pressure on the cylinder is required to move it rearwardly from engagement with the arms 33.

Pivoted near the delivery end of the machine are two arms 34ª having a shaft 34 fixed to their rear ends. This shaft has a series of downwardly extending teeth 35 normally held in a substantially upright position by gravity. The teeth are for the purpose of directing the top portion of a load of material toward the rear and bottom of the wagon bed as the load is moved rearwardly upon the apron, and the arms permit up and down movement of the shaft.

The apron is indicated by the numeral 37 and is of the ordinary construction. Its rear end passes over the sprocket wheels 38 which are fixed to the shaft 39. On one end of the shaft 39 is a worm gear wheel 40 by which the apron is driven as will hereinafter appear.

The means for operatively connecting the spreading cylinder shaft 27 with the apron shaft 39 comprises a shaft 41 rotatably and slidingly supported at its upper rear end in a bearing 42 that is fixed to the arm 26 and rotatably and slidingly supported at its lower end in a bearing 43 fixed to the wagon body. On the upper rear end of the shaft 41 is a grooved wheel 44 loose on the shaft 41 and having a downwardly extending sleeve surrounding the shaft 41 with a lug 44ª at its lower end. A chain 45 is wound around the grooved wheel and is fixed at one end to the grooved wheel and has at its other end a contractible coil spring 46, which spring is fixed to a bell crank lever 47 connected by a rod 48 with the lever 49 at the front of the wagon body.

Immediately below the wheel 44 is a disk 50 loose on the shaft 41 and having a lug 50ª on the upper end to coact with the lug 44ª. This disk 50 is provided with a circular flange 51 having internal ratchet teeth 52. The disk 50 is also provided with a screw 53 having a roller 54 projected outwardly from the disk. This roller 54 is arranged in position to be engaged by the spiral cam 32 in such a manner that as the cam rotates it will engage the roller 54 during each revolution and will move the disk 50 a part revolution for each complete revolution of the cam 32. Adjacent to the disk 50 is a second disk 55 fixed to the shaft 41 and having ratchet teeth 56 at its periphery and also provided with two pawls 57 designed to engage the interior of the rim 51 and yieldingly held in engagement with the teeth 52 by the springs 58, as shown in Fig. 8. Formed on the periphery of the rim 51 is a lug 59 having connected to it a chain 60, and said chain is provided with a spring 61 attached to the arm 14, the parts being so arranged that the spring 61 tends to return the disk 51 after it has been moved by the spiral cam. Mounted on the arm 26 is a pawl 62 designed to engage the ratchet teeth 56 and prevent a backward rotation thereof.

On the lower end of the shaft 41 I have rotatably mounted a sleeve 63 having a flange 64 at its lower end engaged by a flange 65 on the bearings 43 in such a manner as to prevent longitudinal movement of the sleeve 63 relative to the bearing 43. On the upper end of the sleeve 63 is a radially extended lug 66 and fixed to the shaft 41, adjacent to the upper end of the sleeve 63 is a collar 67 having a downwardly extended lug 68 designed to engage the lug 66. When the shaft 41 is at its lower limit of movement the sleeve 63 will be rotated with it, but when the shaft is moved upwardly and rearwardly the lug 68 will disengage from the lug 66 and the shaft may be rotated without moving the sleeve 63. This sleeve 63 is provided at its central portion, as shown in Fig. 2, with a worm gear 69 in mesh with the worm gear wheel 40.

The practical operation of this apron driving mechanism is as follows: By means of the opposing spring 61, the roller 54 is yieldingly held in the path of the spiral cam. During each revolution of the spiral cam the roller 54 will be engaged and the ratchet rim 51 will be moved a part revolution, and on account of the pawls 57 the ratchet wheel 55 will be moved a corresponding distance. As soon as the spiral cam is disengaged from the roller 54 the spring 61 will return the ratchet rim 51 to its original position and the pawl 62 will prevent the ratchet toothed disk 55 from backward rotation. It will be seen that the roller 54 is always returned to position for engaging the spiral cam immediately after the spiral cam has moved past it. Obviously if the spiral cam engaged the roller 54 throughout only part of the length of the spiral cam then the movement imparted to the ratchet disk 51 would be less than though the spiral cam engaged the roller 54 throughout its entire length. Therefore, in order to vary the amount which the ratchet rim 51 is moved during each revolution of the spreading cylinder shaft, it is only necessary to regulate the amount of return movement permitted to the disk 50 after it has been actuated by the spiral cam and this limitation is accomplished effectively by means of the coacting lugs 44ª and 50ª and the chain 45 and the spring 46, the position of the lug 44ª being adjusted by means of the lever 49. The lug 44ª is so positioned that when the lever 49 is at its rearward limit the lug 50ª will strike the lug 44ª when the disk 50 has returned only a slight distance and when the lever 49 is at its forward limit the disk 50 may return a maximum distance before the lugs 44ª and 50ª will engage. The spring 46 serves to cushion the impact of the lugs when they strike. The shaft 41 is only rotated by the cam and roller in one direction as a backward rotation thereof is prevented by the pawl 62 and this rotation of the shaft 41 will operate through the worm gear device to drive the apron. Hence the rate of advance of the apron relative to the speed of the spreading cylinder may be readily, quickly and accurately adjusted by a manipulation of the lever 49. Another advantageous feature of my invention is that in the event that the load is being advanced too rapidly toward the spreading cylinder the spreading cylinder will be engaged thereby and moved rearwardly on its hangers. This will not in any way interfere with the rotation of the spreading cylinder but it will move the shaft 41 rearwardly until the lug 68 is disengaged from the lug 66, whereupon the shaft 41 will rotate idle without moving the apron and this will continue until the spreading cylinder has engaged the excessive material and discharged it from the wagon body and the spreading cylinder has returned to its normal position, whereupon the operation of the shaft 41 will be resumed.

It is to be noted that in my improved spreader the forward operation of the spreading cylinder moves downwardly and rearwardly during the rotation of the cylinder, and in a machine of this kind it is important that the apron be advanced in such a manner as to keep a portion of the load on the apron in position to be engaged by the cylinder teeth so that it is of the greatest importance that automatically operating accurate means are provided for driving the apron at the proper speed to meet the requirements of the kind of material on the apron and also to permit the operator to adjust the device so that the material may be spread more or less thickly upon the ground.

For convenience in description I have in the claims described the rim 51 with its teeth 52 as constituting a ratchet member and the pawls 57 as constituting the other ratchet member, it being my invention to broadly cover any kind of a ratchet device in which one part of the ratchet device is connected with the disk 50 and the other part with the disk 55.

I claim as my invention:

1. In a device of the class described, the combination of a spreading cylinder shaft, an apron advancing shaft, a connecting shaft between the two, means whereby power may be transmitted from the cylinder shaft to the apron shaft through said connecting shaft, and means automatically operated by the pressure of an excessive load on the rear end of the apron for operatively disconnecting the connecting shaft from the apron shaft.

2. In a device of the class described, the combination of a cylinder shaft, an apron shaft, a connecting shaft between them, means for operatively connecting the connecting shaft with the apron shaft, and means for driving the connecting shaft from the cylinder shaft, said means comprising a ratchet member rotatably mounted on the connecting shaft, a coacting ratchet member fixed to the connecting shaft, means for preventing a backward rotation of the connecting shaft, and means operated by the cylinder shaft for moving the ratchet member on the connecting shaft.

3. In a device of the class described, the combination of a spreading cylinder shaft, an apron advancing shaft, a connecting shaft between the two, means operated by the cylinder shaft for rotating the connecting shaft, means for varying the movement of the cylinder shaft as applied to the connecting shaft, a gearing device between the connecting shaft and the apron shaft, and means automatically operated by the pressure of an excessive load on the rear end of the apron for operatively disconnecting the connecting shaft and the apron shaft.

4. In a device of the class described, the combination of a cylinder shaft, an apron shaft, a connecting shaft between them, a ratchet member rotatably mounted on the connecting shaft, a roller carried thereby, a spiral cam on the cylinder shaft to coact with said roller, a ratchet member fixed to the connecting shaft to coact with the other ratchet member, a spring applied to the first ratchet member for returning it to position after it has been moved by the cam, means for preventing the backward rotation of the connecting shaft, and means for operatively connecting the connecting shaft with the apron shaft.

5. In a device of the class described, the combination of a cylinder shaft, an apron shaft, a connecting shaft between them, a ratchet member rotatably mounted on the connecting shaft, a roller carried thereby, a spiral cam on the cylinder shaft to coact with said roller, a ratchet member fixed to the connecting shaft to coact with the other ratchet member, a spring applied to the first ratchet member for returning it to position after it has been moved by the cam, means for preventing the backward rotation of the connecting shaft, and means for operatively connecting the connecting shaft with the apron shaft.

6. In a device of the class described, the combination of a cylinder shaft, an apron shaft, a connecting shaft between them, a ratchet member rotatably mounted on the connecting shaft, a roller carried thereby, a spiral cam on the cylinder shaft to coact with said roller, a ratchet member fixed to the connecting shaft to coact with the other ratchet member, a spring applied to the first ratchet member for returning it to position after it has been moved by the cam, and means for limiting the backward rotation of the first ratchet member comprising a lug on the first ratchet member and an adjustable lug mounted on the connecting shaft to be engaged thereby, and means for operatively connecting the connecting shaft with the apron shaft.

7. In a device of the class described, the combination of a cylinder shaft, two hangers extended rearwardly and downwardly for supporting the cylinder shaft, an apron shaft, a connecting shaft having one end supported in bearings mounted on one of the hanger arms and having its other end slidingly mounted in bearings adjacent to the apron shaft, a wheel loosely mounted on the connecting shaft, a lug carried by said wheel, a chain fixed to said wheel and wound upon it, yielding adjustable means for supporting the other end of said chain, a ratchet member on the connecting shaft, a roller carried by said ratchet member, a lug on the said ratchet member to coact with the lug on the said wheel, a spiral cam on the cylinder shaft to coact with said roller, a spring applied to said ratchet device tending to move it in a direction opposite from that in which it is moved by the cam, a second coacting ratchet member fixed to the connecting shaft, means for preventing a backward rotation of the connecting shaft, a gearing device for connecting the connecting shaft with the apron shaft, and a clutch device for operatively disconnecting said gearing device when the connecting shaft is moved rearwardly with the hanger arms that support the spreading cylinder.

8. In a device of the class described, the combination of a wagon body, supporting wheels therefor, hanger arms at the rear of the wagon body, a spreading cylinder having its shaft mounted in said hanger arms, means for limiting the forward movement of the spreading cylinder, means operatively connected with a supporting wheel for rotating the spreading cylinder, a spiral cam on one end of the spreading cylinder shaft, an apron shaft, a worm gear wheel fixed thereto, a connecting shaft having one end mounted in bearings in one of the hanger arms, and having its other end slidingly mounted in bearings in the wagon body, a wheel rotatably mounted on the rear end of the connecting shaft, a lug thereon, a rim having internal ratchet teeth rotatably mounted on the connecting shaft and having a lug to coact with the lug on the said wheel, a chain fixed to and wound upon the wheel, a spring connected to the chain, a bell crank lever connected to the spring, a hand lever connected to said bell crank lever, a roller carried by said ratchet rim, a spiral cam on the cylinder shaft to engage said roller, a disk fixed to the connecting shaft, a spring actuated pawl carried by the disk to engage the ratchet teeth on the said ratchet rim, said disk having ratchet teeth on its periphery, a pawl connected to a stationary support to engage the latter ratchet teeth, a spring connected to the ratchet rim and designed to move it in a direction opposite to the movement given to it by the spiral cam, a worm gear slidingly mounted on the lower end of the connecting shaft and in mesh with the worm gear wheel on the apron shaft, said worm gear having a clutch member at its upper end, and a clutch member carried by the connecting shaft to coact with the clutch member on the worm gear, whereby the connecting shaft is operatively disconnected from the worm gear when the spreading cylinder moves rearwardly.

Des Moines, Iowa, Oct. 9, 1911.

CHARLES L. DYK.

Witnesses:
   HENRY K. BEKMAN,
   BERT LUBBERS.

---

Copies of this patent may be obtained for five cents each, by addressing the "Commissioner of Patents, Washington, D. C."